(12) United States Patent
Bonnet et al.

(10) Patent No.: US 9,086,113 B2
(45) Date of Patent: Jul. 21, 2015

(54) SAFETY LINK DEVICE AND AIRCRAFT EQUIPPED WITH SUCH A SAFETY LINK DEVICE

(75) Inventors: Mathieu Bonnet, Toulouse (FR); Benoit Valery, Toulouse (FR)

(73) Assignee: AIRBUS Operations S.A.S., Toulouse (FR)

( * ) Notice: Subject to any disclaimer, the term of this patent is extended or adjusted under 35 U.S.C. 154(b) by 725 days.

(21) Appl. No.: 13/269,781

(22) Filed: Oct. 10, 2011

(65) Prior Publication Data
US 2012/0132493 A1 May 31, 2012

(30) Foreign Application Priority Data
Oct. 11, 2010 (FR) ..................................... 10 58220

(51) Int. Cl.
*F16F 15/023* (2006.01)
*B64D 27/26* (2006.01)
*F16F 15/00* (2006.01)
*F16F 9/56* (2006.01)
(Continued)

(52) U.S. Cl.
CPC .............. *F16F 15/023* (2013.01); *B64D 27/26* (2013.01); *F16F 9/062* (2013.01); *F16F 9/3207* (2013.01); *F16F 9/50* (2013.01); *F16F 9/56* (2013.01); *F16F 2230/16* (2013.01)

(58) Field of Classification Search
CPC ................. F16F 7/00; F16F 9/00; F16F 9/06; F16F 9/062; F16F 9/065; F16F 9/08; F16F 9/3207; F16F 9/50; F16F 9/56; F16F 9/58; F16F 2222/12
USPC .................... 188/266, 322.19, 321.11, 106 F; 267/136, 140.11, 64.11, 64.26; 248/554; 403/167; 244/54
See application file for complete search history.

(56) References Cited

U.S. PATENT DOCUMENTS 4,452,436 A * 6/1984 Gute .......................... 267/64.15
4,752,062 A * 6/1988 Domenichini ................ 267/186
(Continued)

FOREIGN PATENT DOCUMENTS

DE   10 2008 045 492 A1   3/2010
EP        0 501 658 A1    9/1992
(Continued)

OTHER PUBLICATIONS

French Preliminary Search Report issued Jul. 7, 2011, in French 1058220, filed Oct. 11, 2010 (with English Translation of Category of Cited Documents).
(Continued)

*Primary Examiner* — Melody Burch
(74) *Attorney, Agent, or Firm* — Oblon, McClelland, Maier & Neustadt, L.L.P.

(57) ABSTRACT

A link device for safety linking of a first member to a second member includes a first element, a second element, and a fluidic vibration transfer mechanism. The first element includes a first link end adapted to be directly linked to the first member, and a second link end adapted to be directly linked to the second member. The second element has a first link end adapted to be directly linked to the first member, and a second link end adapted to be directly linked to the second member. The fluidic vibration transfer mechanism links the first and second elements of the link device to one another, and includes at least two pressure chambers filled with a pressurized liquid, separated by at least one piston integral with the first or second element.

18 Claims, 6 Drawing Sheets

(51) Int. Cl.
*F16F 9/50* (2006.01)
*F16F 9/32* (2006.01)
*F16F 9/06* (2006.01)

(56) References Cited

U.S. PATENT DOCUMENTS

| | | | |
|---|---|---|---|
| 5,174,552 A | 12/1992 | Hodgson et al. | |
| 5,251,883 A * | 10/1993 | Simon et al. | 267/136 |
| 5,269,489 A | 12/1993 | West et al. | |
| 5,568,847 A | 10/1996 | Guilloud et al. | |
| 5,762,295 A * | 6/1998 | McGuire et al. | 244/54 |
| 6,092,795 A | 7/2000 | McGuire | |
| 6,161,821 A * | 12/2000 | Leno et al. | 267/64.24 |
| 8,042,342 B2 | 10/2011 | Diochon et al. | |
| 2005/0269444 A1 | 12/2005 | Marche | |

FOREIGN PATENT DOCUMENTS

| | | | |
|---|---|---|---|
| EP | 1 571 080 A1 | | 9/2005 |
| FR | 1 039 712 | | 10/1953 |
| FR | 2599793 A | * | 12/1987 |
| FR | 2 689 951 A1 | | 10/1993 |
| FR | 2 761 745 A1 | | 10/1998 |
| FR | 2920178 A1 | * | 2/2009 |
| FR | 2 951 792 | | 4/2011 |
| WO | WO 99/06734 | | 2/1999 |

OTHER PUBLICATIONS

U.S. Appl. No. 13/184,979, filed Jul. 18, 2011, Bonnet, et al.

* cited by examiner

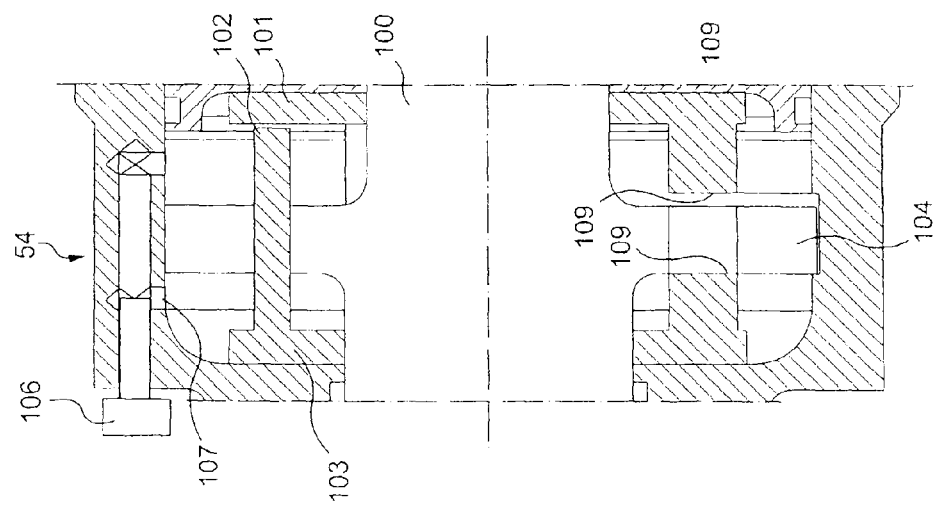
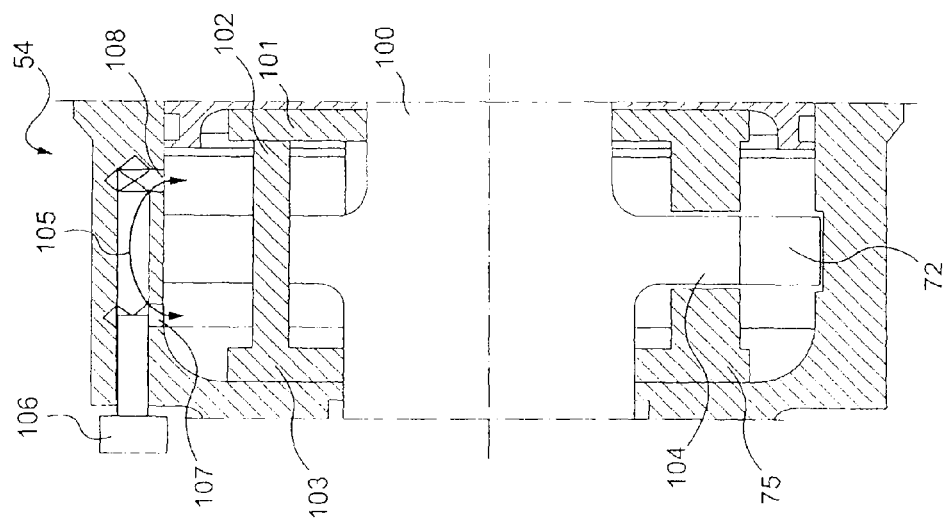

SAFETY LINK DEVICE AND AIRCRAFT EQUIPPED WITH SUCH A SAFETY LINK DEVICE

BACKGROUND OF THE INVENTION

1. Field of the Invention

The present invention relates to a safety link device. It also relates to an aircraft equipped with such a safety link device.

2. Background

In the prior art, it is known to use connecting rod-shackle assemblies to link a first vibrating member of a structure to a second member of that structure, for example the engine of a vehicle to a part of the vehicle. More particularly, connecting rod-shackle assemblies are used between an aeronautic load such as a turbojet engine and a structural element such as a pylon for attachment to the aircraft. The attachment between the aircraft structure and the engine is achieved by means of a shackle, which picks up the forces along one axis, and at least one connecting rod or rocker bar that transfers the forces in a plane containing the axis of the shackle.

Furthermore, it is also known in the prior art to use failure-protection assemblies (also commonly known as "fail-safe" in English terminology), wherein the link elements are doubled in parallel, so that, when one of the two elements is broken, the other element is able to continue to perform their common function in the link device.

Particularly in the case of an attachment using a shackle and a connecting rod, it is known to double the shackle, but only in rigid manner. Because of the rigidity of the shackle, the vibrations produced in particular by the operation of the load are transmitted into the attachment pylon. The vibrations produced are then able to reach the entire structure of the airplane.

SUMMARY

The present invention makes it possible to provide a remedy for this disadvantage of the prior art, in that it relates to a device for safety linking of a first member to a second member, comprising:

a first element having one link end adapted to be linked to the said first member, one link end adapted to be linked to the said second member;

a second element having one link end adapted to be linked to the said first member, one link end adapted to be linked to the said second member;

The invention is characterized in that the first and second elements of the link device are linked to one another by a fluidic means for transferring vibrations transmitted by the links to the first and second members, at least below a specified force threshold, the said fluidic vibration-transferring means being provided with at least two pressure chambers filled with a pressurized liquid, separated by at least one piston integral with the first or second element, the fluidic vibration-transferring means being connected by flexible tubes to a remote vibration-filtering device provided with a distributor having two chambers, connected to the said flexible tubes and separated by a distribution piston subjected to the vibration-filtering action of at least one tank of a gas under specified pressure.

One advantage of this arrangement is that it becomes possible for a safety link device of the type known as "fail-safe" with two parallel paths for transferring forces to operate, at least below a specified force threshold, with filtering of the vibrations produced by the first and/or second member linked and remote from the link device proper, thus avoiding problems of space requirements.

According to other advantageous characteristics of the device of the invention:

the first element being provided with a tubular portion extending along a longitudinal axis and the second element being provided with a tubular portion extending along a longitudinal axis, the fluidic vibration-transferring means is mounted concentrically in specified manner in the interior, on the exterior or at one of the ends of the two tubular portions;

One advantage of this arrangement is to provide a compact construction for the safety link device without adding a large number of parts.

the first and second elements are additionally linked by at least one link with calculated functional play so that the fluidic vibration-transferring means is active up to a specified force threshold on the link device;

An advantage of this arrangement makes it possible to determine precisely the force threshold below which the safety link device can work with filtering of vibrations, this force threshold corresponding to the limit of the usual loads, referred to a fatigue loads.

in practice, the link with calculated functional play is provided with at least one oblong hole made on one of the said first and second elements and intended to cooperate via a shaft or pin with another hole of diameter smaller than the dimension of the oblong hole, the hole of smaller diameter being made on the other of the said first and second elements so that the shaft or pin is able to follow a vibratory movement in the direction of the oblong hole within the limit of the calculated functional play;

In this way a simple and effective means is employed to determine a functional play defining the force threshold for the limit of filtration of vibrations.

the distribution piston cooperates with a fluidic damper configured to damp the shocks sustained by the first and second elements; an advantage of this arrangement is to cancel out the shock felt by the first and second elements of the safety link device when the functional play has reached its limits;

the compressed gas tank of the vibration-filtering device is connected to an elastic torus introduced into each air chamber of a plurality of gas chambers, whose volume is slaved, by a rod and associated washers, to the displacements of the distribution piston in order to filter the vibrations transmitted by the first and second elements in a vibration-filtering mode; an advantage of this arrangement is that the vibration-filtering force can be distributed along a rod integral with the distribution piston;

between each gas chamber there are disposed:

an interior washer integral with the distribution piston;

an exterior washer integral with a part for transferring forces of the vibration-filtering device;

the interior and exterior washers being configured so as to permit vibration filtering in both directions of displacement of the distribution piston; one advantage of this arrangement lies in the bidirectional filtering effect, which is effective in both directions of displacement of the rod and of the transfer of forces to the casing of the vibration-filtering device.

the fluidic damper cooperating with the distribution piston is provided with at least two chambers separated by a damping piston and in communication via a plurality of damping-fluid passages; one advantage of this arrangement is that damping can be added to the vibration-filtering effect;

at one end at least of the travel of the distribution piston, the damping imposed by the damper of the mixed hydraulic and pneumatic pressurization and pressure-control system is maximized by neutralization of a plurality of damping-fluid passages; by virtue of this fluidic damper, it is possible to cancel or at least greatly reduce the shock that occurs when the extension of the functional play reaches at least one of its extremes.

The invention also relates to an aircraft provided with a safety link device according to the invention.

BRIEF DESCRIPTION OF THE SEVERAL VIEWS OF THE DRAWINGS

Other characteristics and advantages of the present invention will be better understood by means of the description and of the figures, wherein:

FIGS. 7a and 7b show two diagrams for explaining two modes of operation of another part of a link device according to the invention;

DETAILED DESCRIPTION OF THE INVENTION

Figure 1:
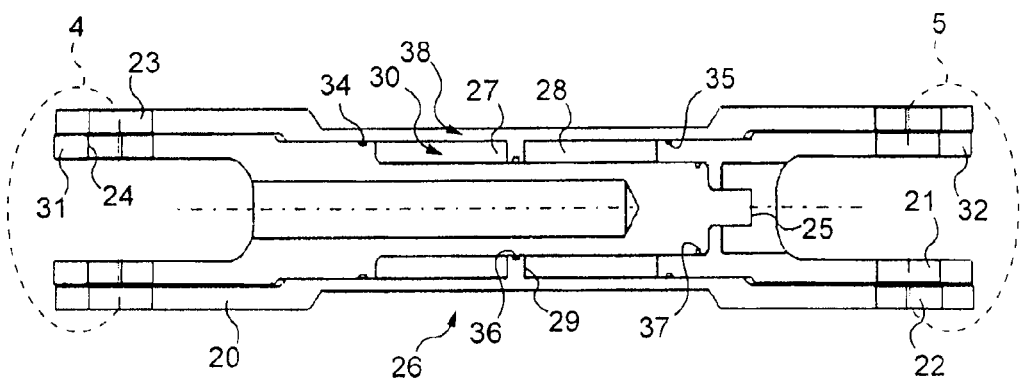
FIG. 1 is a schematic view in section of a first embodiment of a link device according to the invention.

A first embodiment of a link device according to the invention has been shown in FIG. 1. The safety link device is provided in principle with a first element 20 and a second element 31. First 20 and second 31 elements of the device of the invention are mechanically connected by a fluidic vibration-transferring means 26. First 20 and second 31 elements each have at least one tubular portion, first tubular portion 38 for first element 20 and second tubular portion 30 for second element 31. In the embodiment of FIG. 1, so that first tubular portion 38 of first element 20 is concentric with and exterior to second tubular portion 30 of second element 31.

According to the invention. fluidic vibration-transferring means 26 has the form of a hydraulic distributor. It is provided with first 27 and second 28 hydraulic chambers, into which there is injected a pressurized liquid. In one particular embodiment, the pressurized liquid is an incompressible liquid, such as oil. It is chosen in order to retain its elastic properties within the working temperature range of the link device.

The two hydraulic chambers 27 and 28 are separated by an annular piston 29. Annular piston 29 is integral with the interior of a tubular portion of first element 20. Piston 29 carries a scraper segment 36 that rubs over tubular portion 30 facing second element 31. Other segments 34-37 are disposed on the tubular portions so as to assure leaktightness and lubrication of the parts in contact with the first and second elements of the link device.

Finally, second element 31 proper, at the left of FIG. 1, is terminated by a head of second element 32, which is mounted via a bore 25 at the end of first element 31. Second element proper 31 and its head 32 are joined by a nut (not shown) mounted on the threaded end (thread not shown) of second element proper 31. The nut then operates by traction.

Furthermore, the link device of the present invention is linked to a first member 4, represented by dashed lines at the left of FIG. 1, and to a second member 5, represented by dashed lines at the right of FIG. 1. First 4 and second 5 members and the link device of the invention are made integral by a system of shafts or pins. A shaft or pin, attached to first member 4, is placed in a circular hole 23 on first element 20 and in an oblong hole 24 made in second element 31.

In the same way, second member 5 is linked at the right of FIG. 1 by a shaft or pin penetrating into a circular hole 21 of head 32 of the second element and into an oblong hole 22 made on the other end of first element 20.

The difference between the largest dimension of oblong holes 24, 22, chosen along the differential travel between the first 20 and second 31, 32 elements, and the diameter of circular hole 23 or 21 makes it possible to establish a functional play in the mechanical link between the first and second elements. As a result, the functional play between the two elements 20 and 31 is controlled by fluidic vibration-transferring means 26 between first 20 and second 31 elements. Fluidic vibration-transferring means 26, with fluidic or hydraulic form, is adjusted to the previously calculated fatigue loads. When the load applied to the safety link device is smaller than a calculated threshold, the vibrations produced by the first and/or the second member are converted into alternating movement of second element 31 in the interior of first element 20. The vibratory alternating movement is then transmitted by piston 29 into chambers 27 and 28, thus causing variation of the pressures in flexible tubes connected to vibration-filtering system 42 (see FIG. 2). This fluidic connection makes it possible for fluidic vibration-transferring system 42 to act remotely from the safety device.

When the load increases further, the travel of second element 31 in first element 20 of the link device of the invention entrains the shafts or pins making first 4 and second 5 members integral to a stop in the oblong holes made in first element 20. The link device then no longer functions in fluidic or hydraulic damping mode but instead in a mode of rigid deformation of its first 20 and second 31 elements. The vibrations of first 4 and/or second 5 member are then no longer transmitted by vibration-transferring fluidic means 26 of fluidic or hydraulic type.

In one application of the invention, an airplane engine mounted in its nacelle is made integral with an attachment pylon under the rear fuselage of the airplane. In this case, the engine is made integral by the intermediary of a connecting rod and/or shackle on the attachment pylon. Preferably, for questions of reliability and safety, the shackle is then doubled without play. The connecting rod operates to transmit forces from the doubled shackle. According to the invention, when a connecting rod is used as a safety link device according to the invention, the vibrations produced by the engine are transmitted in their entirety to the device of the invention. The latter, by virtue of fluidic vibration-transferring means 26, makes it possible, by transfer of vibrations to a gas-filled vibration-filtering system 42 (FIG. 2), within a range of specified loads, on the one hand to filter the vibrations and on the other hand to make the engine integral with the attachment pylon by way of a connecting rod with safety capability in case of rupture of one of the two elements of the first or second element of the link device. The parallel doubling of the shackle ensures the same safety of the attachment system. Thus it is not necessary to attempt filtering of the vibrations at the doubled shackle, which would be extremely penalizing from the design viewpoint. In fact, filtering of vibrations at the connecting rod or rods of the connecting rod-shackle attachment system is effective at the connecting rod alone.

Figure 2:
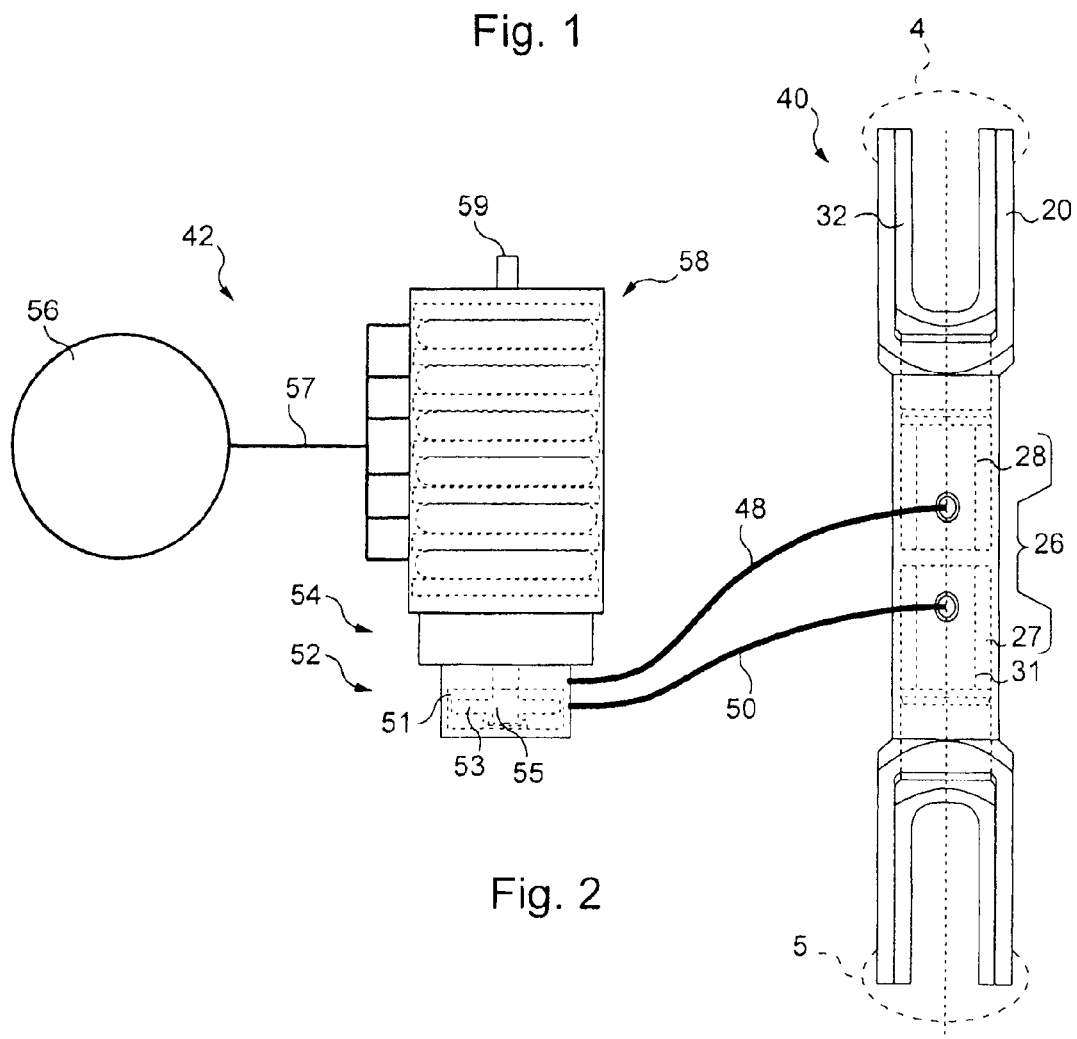
FIG. 2 shows a first embodiment of an assembly incorporating a link device of the embodiment of FIG. 1.

An application of the filtering principle of the invention with the vibration-filtering device of FIG. 1 offset remotely has been shown in FIG. 2. Safety link device 40 cooperates with a gas-filled vibration-filtering system 42.

In one embodiment, gas-filled vibration-filtering system 42 is provided with a distributor 52 analogous to fluidic vibration-transferring means 26. Distributor 52, which will be described in more detail, is provided with an oil-filling means during manufacture of the link device of the invention and during maintenance. Preferably, the oil-filling means cooperates with an oil-replenishing means to compensate for oil leaks as well as with an oil level sensor for controlling the oil-replenishing means. Distributor 52 of gas-filled vibration-filtering system 42 makes it possible to receive and remotely treat the vibrations exchanged between first 30 and second 31 elements of the safety link device on the one hand and to cancel out the shocks sustained by the calculated functional play system on the other hand. The pneumatic or air-operated part of gas-filled vibration filtering system 42 is dimensioned so as to filter the vibrations exchanged between first 30 and second 31 elements of the safety link device. The gas-filled or pneumatic part of gas-filled vibration-filtering system 42 is configured as a low-pass filter for the vibrations transmitted by the hydraulic part.

For this purpose, the pneumatic part of gas-filled vibration-filtering system 42 associated with the safety link device of the invention is provided with an air tank 56 that is in communication fluidically via a compressed-air distribution network 57 with a set 58 of air chambers mounted around a rod 59, with which the chambers are integral. The pneumatic part is configured as a low-pass filter for vibrations transmitted by rod 59. For this purpose, rod 59 is mechanically coupled with a movable part of the hydraulic part of gas-filled vibration-filtering system 42. Thus the hydraulic part of gas-filled vibration-filtering system 42 is configured so that rod 59 passes through a hydraulic damper 54 then is connected to piston 55 of a pressure distributor 52. Pressure distributor 52 is provided with two chambers, respectively 51 and 53, separated by distribution 55 piston. Two flexible lines 48 and 50 permit the two chambers 51, 53 of distributor 52 to be in communication with the two controlled chambers 27 and 28 respectively of fluidic vibration-transferring means 26 of link device 40.

In the embodiment of FIG. 2, by dimensioning gas-filled vibration-filtering system 42 correctly, it is possible to control the instantaneous pressure in vibration-transferring means 26 remotely. A supplementary function of gas-filled vibration-filtering system 42 is to cancel out or damp the shock applied by link device 40 when it exits the vibration-filtering mode when the relative travel of second element 31 in first element 20 exceeds the functional play permitted by the oblong holes via which the two elements are made integral.

Figure 3:
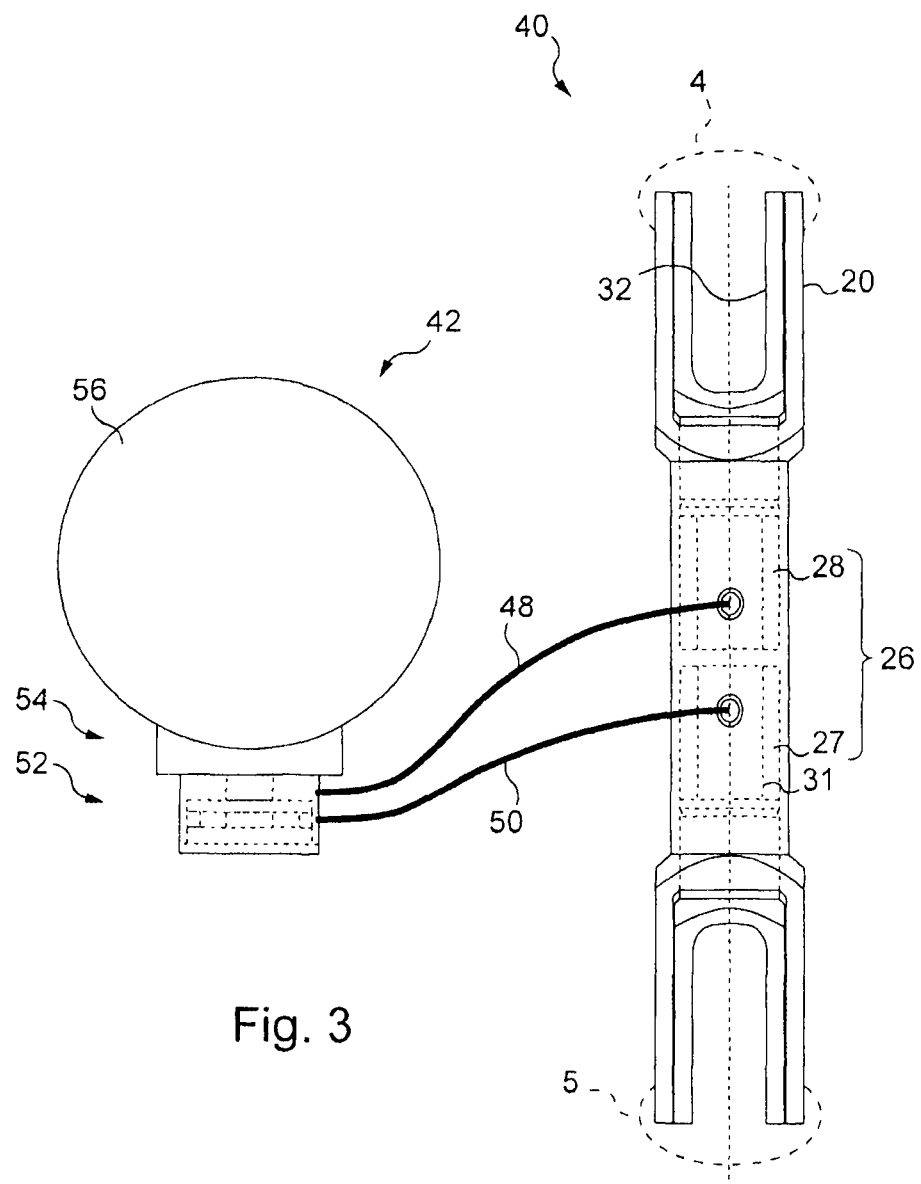
FIG. 3 shows another embodiment of a link device according to FIG. 1.

Another embodiment of gas-filled vibration-filtering system 42, in which the set of chambers 58 has been removed, has been shown in FIG. 3. The pressure in compressed-air tank 56 is directly applied on a diaphragm, not shown, successively to a central rod of hydraulic damper 54, then distribution piston 55 of distributor 52, in communication via flexible lines 48 and 50 with link device 40. The pressure in the air tank is set so as to achieve low-pass filtering of vibrations sensed by the distributor constituting vibration-transferring means 26. Distributor 52 of system 42 causes vibration of rod 59 through, as the case may be, liquid damper 54, and rod 59 (not shown in FIG. 3), connected to a piston and/or diaphragm loaded by air tank 56, filters the vibrations. As a result, rod 59 is braked by the gas-filled filter and its effect is transferred by flexible tubes 48 and 50 to vibration-transferring means 26. Therefore, the two mechanically integral elements of chambers 27 and 28 are themselves also braked, and the vibrations between integrally connected members 4 and 5 are filtered effectively.

Figure 4:
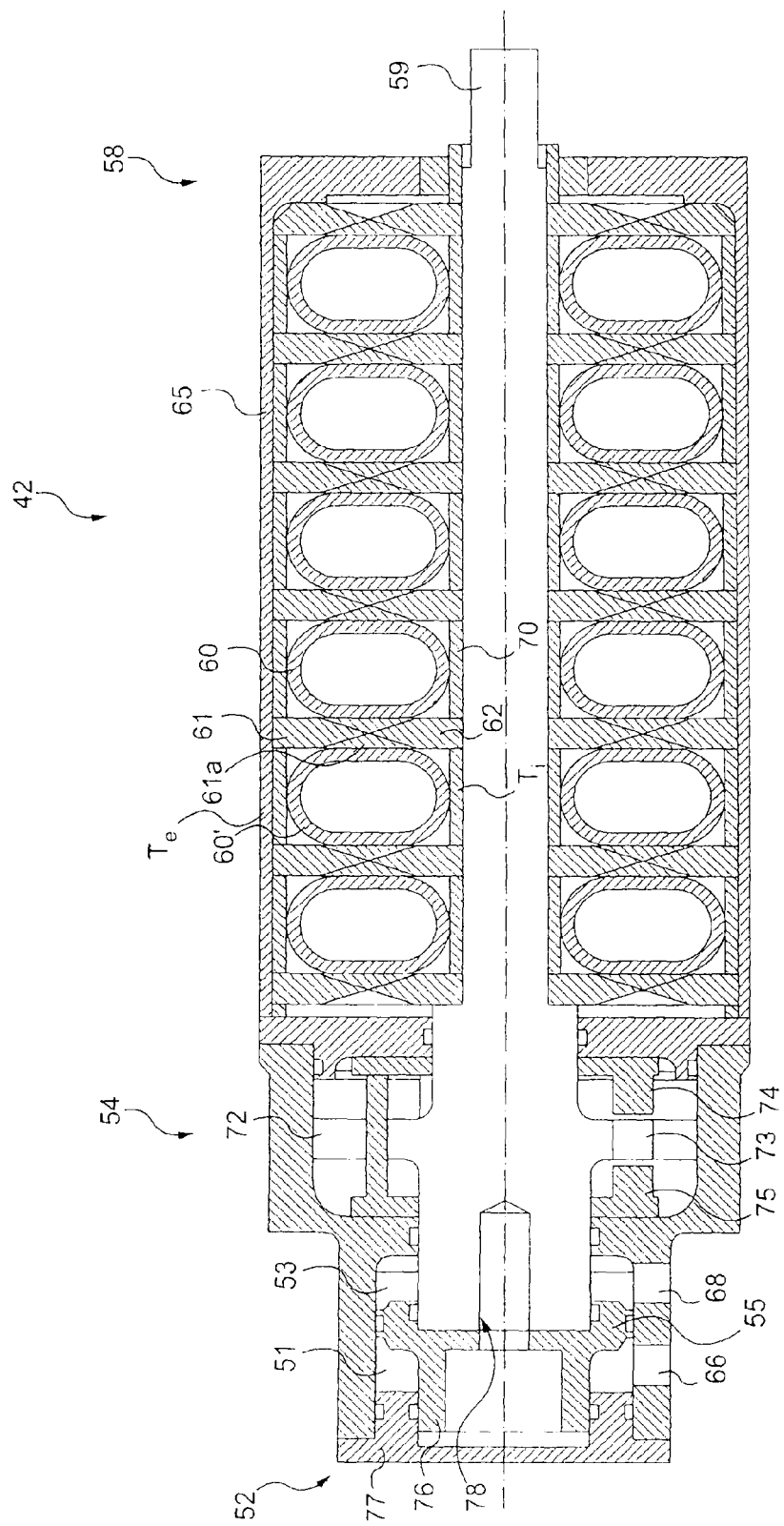
FIG. 4 shows an embodiment of part of a link device according to the invention.

A particular embodiment of gas-filled vibration-filtering system 42 has been shown in FIG. 4. Rod 59 of gas-filled vibration-filtering system 42 passes through set 58 of air chambers. In the described embodiment, set of air chambers 58 is a combination of six chambers in series. In each air chamber there is disposed a flexible torus, such as torus 60, made of elastomer such as those produced by Firestone™. Each torus 60 is in communication with the air tank, such as air tank 56 of FIG. 2. Each torus is made of impermeable elastomer provided with a valve (not shown) for connection to the network of flexible tubes in communication with compressed-air tank 56 (FIG. 2). The mean pressure is selected between 10 and 30 bar in the application of the link device according to the invention for attachment of an aircraft engine under the rear fuselage.

The toruses of set 58 of air chambers are inserted between washers, such as washers 61 and 62. At each level between two successive toruses, an external washer 61, whose center is cut out, is integral with exterior wall 65 of the set of air chambers 58. Similarly, an internal washer 62 is integral with central rod 63. Internal 62 and external 61 washers are free relative to one another. The pressure of lower 60' and upper 60 toruses around each pair of washers 61, 62 is transmitted to the two washers by the intermediary of upper 61a and lower 62a rings respectively. These two rings make it possible to maintain non-sliding contact respectively with upper torus 60 for upper ring 61a and with lower torus 60' for lower ring 62a. During the same time, sliding contact is assured between rings 61a and 62a with the interior rim of exterior washer 61 and with the exterior rim of interior washer 62. The rim in interior contact of exterior washer 61 with the rim of lower ring 61a on the one hand and the rim in interior contact of interior washer 62 with the rim of upper ring 62a on the other hand are bifurcated and are made of material that assures relative sliding. This arrangement in the pneumatic part of system 42 makes it possible to transmit a displacement of rod 63, when it is entrained by pressure variations detected in fluidic vibration-transferring means 26 of link device 40 (FIG. 2), over toruses 60, 60', which then become deformed according to a relationship that depends mainly on the air pressure in tank 56.

To apply a displacement to rod 59, distributor 52 mounted at the left end of gas-filled vibration-filtering system 42 of FIG. 4 is connected by a hole 66 and by a hole 68 to the corresponding chambers of link device 40 (FIG. 2). Each hole 66 or 68 opens into a chamber 51 and 53 respectively of distributor 52, separated from one another by a distribution piston 55. Distribution piston 55 is provided with a shell 76 that passes into a bore of a plug 77 that closes the left end of distributor 52 in the drawing. Leaktightness is assured by two segments not represented by reference numerals. Depending on relative displacements of the first and second elements of the link device (see FIG. 1 to 3), or on pressure variations between chambers 27 and 28 (FIG. 1) or 44, 46 (FIGS. 2 and 3), the pressure variations in distributor 52 are converted into an alternating translational movement over rod 59, which is linked to distribution piston 55 by a fastening 78.

Between distributor 52 and set of air chambers 58, a hydraulic damper 54 has been interposed. Hydraulic damper 54 is provided with a disk-shaped plate 72, which is integral with the foot of rod 63. An annular assembly 75 is equipped with perforations intended to place the different parts of the volume of hydraulic damper 54 in communication via one or more passages or holes 73 made in annular plate 72 integral with rod 63. Consequently, in medium deflections, the oil contained in the hydraulic damper is able to pass through hole 73 and applies braking to the movements of rod 63.

Thus, as will be seen hereinafter, when plate 75 is outside this median position, it completely obstructs hole 73 and no longer applies any damping when one of the chambers has reached a sufficient depression. This situation is reached when the relative travel of the first and second elements of the link device has reached an extreme value in one direction or the other, transmitted remotely by the hydraulic part of filtering system 42. This situation is achieved by construction of the link device proper and of remote vibration-filtering system 42, and is identical to that in which the limits of the functional play determined by the attachments of first 20 and second 31 elements of the link device are attained.

Figure 6:
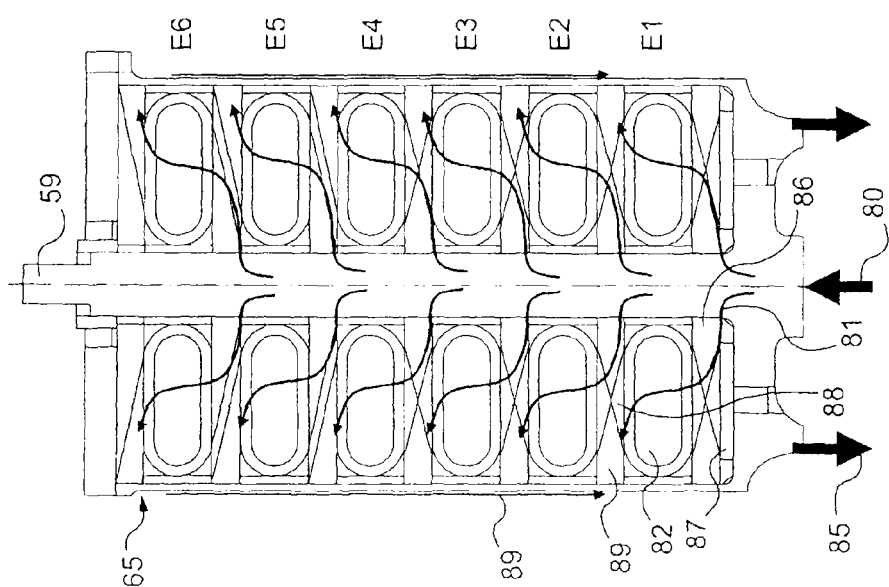
FIGS. 5 and 6 show two diagrams that make it possible to explain two modes of operation of the part of the link device shown in FIG. 4.
Figure 5:
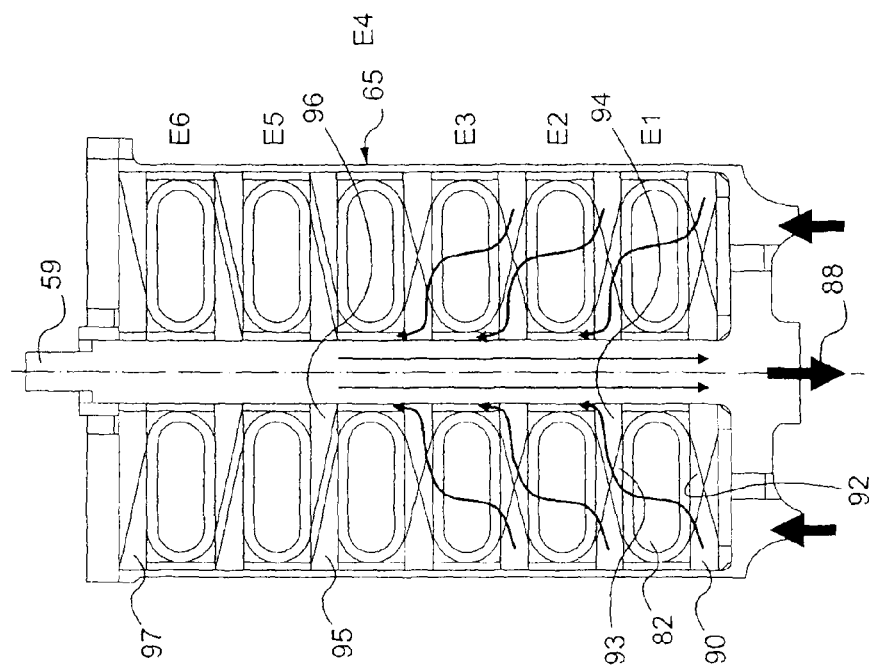

In the embodiment of FIGS. 5 and 6, the set of air chambers of FIG. 4, each being provided with an elastomeric torus under air pressure, and a set comprising an internal washer, an external washer in sliding contact with upper and lower rings, and an internal washer, which set has already been described, have been taken up again. This set is supplemented by an interior tube Ti, integral with rod 59 (FIGS. 4, 5 and 6), and by an exterior tube Te, which can slide along the interior wall of casing 65 (FIGS. 4, 5, 6). With this arrangement, rod 59 can be displaced relative to casing 65, and the forces are transmitted from one to the other by the intermediary of toruses and separating platforms between air chambers, each platform being composed of a set of internal and external washers and of upper and lower rings.

When rod 63 is working in compression (FIG. 5), the forces applied to rod 63 are directed along arrow 80. On the last three platforms of internal and external washers, an arrangement that prevents any movement beyond the compression direction has been disposed. If rod 59 descends back in the direction opposite to arrow 80, the internal and external washers come into contact and add resistance to the movement of the toruses inserted between the two stages of internal and external washers.

On the other hand, the following stages of internal and external washers act in both directions. Thus, when a force is applied to rod 59 along arrow 80, the force is transmitted by a torus 82, first via an internal washer 81, then to external washer 83 of the following stage and so on along the path of the following stages along rod 59. The forces are then transferred by exterior wall 65 in the direction of arrow 84 and are applied to the casing, not shown in FIG. 5a, of hydraulic damper 54. In this way the casing or exterior wall constitutes a means of transferring the forces exchanged between rod 59 and vibration-filtering toruses 60, 60'.

The set of air chambers 58 working in tension mode has been shown in FIG. 6. The forces are applied to rod 59 along arrow 88, and transfer of force to the casing of hydraulic damper 54 takes place along arrows 89.

Similarly, the forces involved on rod 59, on the stages of washers and toruses are transferred from an external washer 90 to torus 91 then to internal washer 92. The force is then applied to rod 59 along arrow 88.

A state of operation of hydraulic damper 54 of the embodiment of gas-filled vibration-filtering system 42 of FIG. 4 has been shown in FIGS. 7a and 7b.

Plate 72 shown in FIG. 4 has been shown once again in FIG. 6a as integral with part of rod 59 (FIG. 4). Annular plate 72 is perforated with holes such as hole 104. Hole 104 faces an annular device 75 so that, in a medium functioning of plate 72, the pressurized oil in damper 54 is additionally able to pass through a nozzle 105 in the upper part of the drawing. This nozzle 105 makes it possible for oil to circulate on both sides of plate 72, via holes 107 and 108. The passage of oil between the two parts is made possible by adjusting a screw 106, with which the passage can be made smaller or larger. The displacements of oil therefore take place substantially via this passage or via the holes in the piston or its annular plate.

Rod part 100 is guided by columns 102 penetrating into holes, not shown, in annular plate 72.

The position of hydraulic damper 54 when rod 100 has arrived at an extreme position, here on the left, has been shown in FIG. 7b. Such an extreme position is attained by virtue of correct dimensioning of link device 40 proper and of associated gas-filled vibration-filtering system 42, when a shaft or pin for making first 4 and/or second 5 member (FIGS. 1 and 2) integral, which members are made integral by link device 40, comes into contact with the bottom of oblong hole 22 or 24 (FIG. 2). This arrangement makes it possible to reduce the shock effect that would otherwise mark the end of the fluidic vibration-transferring mode when the link device has reached a first load limit. In this case, hole 104 is completely obstructed by finger 109 of the annular plate, and the braking applied to rod 59 is maximum.

Figure 8:
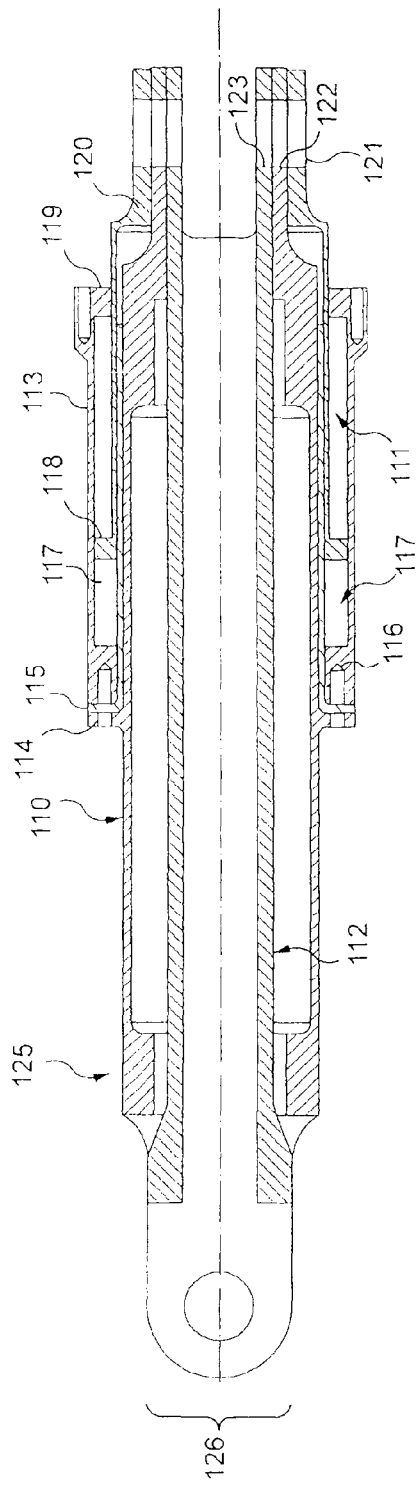
FIG. 8 shows a second embodiment of a link device according to the invention and FIG. 9 shows a third embodiment of a link device according to the invention.

A second embodiment of a link device according to the invention has been shown in FIG. 8. In the embodiment of FIG. 8, the fluidic vibration-transferring means is no longer disposed inside the space defined between concentric first tubular portion 110 and second tubular portion 112 of first 125 and second 126 elements of the link device. In this second embodiment, the fluidic vibration-transferring means is outside the tubular portion 110 most exterior to the link device.

In FIG. 8, first tubular portion 110 of first element 125 of the link device has a peripheral projection forming an integral peripheral ring 114. The flanged rim of a cylindrical bush 115 coaxial with first and second tubular portions 110 and 112 is stopped against this ring 114. A cylindrical tube 113, concentric with first and second tubular portions 110 and 112, surrounds the whole and at the left of the drawing has a rim in contact with the flanged rim of bush 115. By means of a plurality of holes tapped in ring 114, the flanged rim of bush 115 and the left rim of tube 114, these components can be made integral by screws (not shown).

Furthermore, a piston 118 is provided in space 111, 117 defined between the exterior of first tubular portion 110 and tube 113 to constitute the two hydraulic pressure chambers of the fluidic vibration-transferring means. Piston 118 is produced by forming of the left rim of a cylindrical tube 120 that is concentric with first tubular portion 110. On the right side of the drawing, a cover 119 closes the other end, so that pressure chamber 111 is closed in leaktight manner.

Finally, second tubular portion 112 belonging to second element 126 of the link device of the invention is placed concentrically with the other tubular portions and in the interior of the assembly. First 110 and second 112 tubular portions as well as tube 120 carrying separating piston 118 of hydraulic chambers 111, 117 are made integral with a functional play by oblong holes 112 and 123, which come onto a shaft or pin, not represented, installed in a circular hole 121 made at the end of tube 120 carrying separating piston 118 of the two hydraulic chambers 111, 117.

As long as the shaft or pin (not shown) in hole 121 does not come into contact with one of the rims of the oblong holes, the movements of tube 120 are braked and filtered by piston 118 in chambers 111 and 117, as was indicated for the other embodiment.

Figure 9:
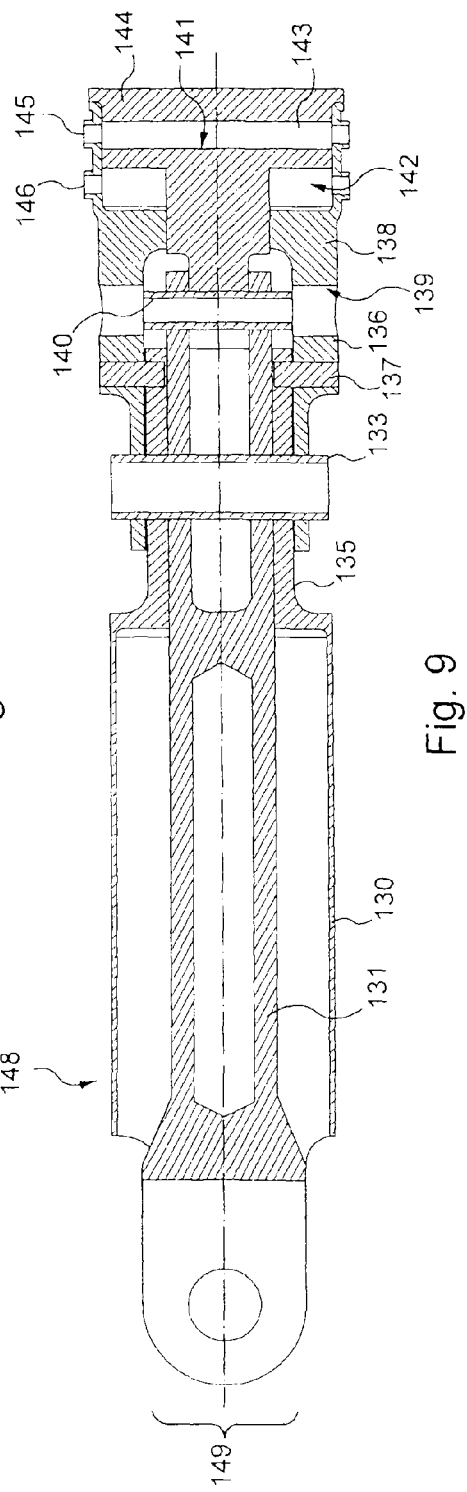

A third embodiment of a link device according to the invention has been shown in FIG. 9. In this embodiment, first 148 and second 149 elements have concentric tubular portions, respectively 130 exterior and 131 interior. The attachments to the first and second members (not represented in FIG. 9) are situated on the two sides of these tubular portions and will not be further described, nor will their calculated functional plays.

The fluidic vibration-transferring means that makes it possible to couple first tubular portion 130 with second tubular portion 131 has been mounted without concentric relationship on the upper head of the link device of the invention. A cylindrical piece 138 is provided with a solid base and a cup-shaped head, of generally cylindrical shape, coaxial with first 130 and second 131 tubular portions, in which there are machined two hydraulic chambers 143 and 142, separated by a piston 141. Chamber 143, which is farthest to the right in the drawing, is closed by a cover 144. The oil distributed and braked by pressurization and pressure-control system 42 of FIG. 4 is transmitted by flexible lines, not shown, via holes 146 and 145 communicating with the two chambers 142 and 143.

Piston 141 is movable between the two chambers 142, 143 and mounted on a shaft 140 of tubular portion 131 of the second element, at the right end on the drawing. Shaft 140 can be displaced freely in an oblong hole 139 made in cylindrical part 138, on which there are formed the two chambers 142 and 143 of the vibration-filtering means of the invention.

First tubular portion 130 is then made integral by a shaft or pin 137 with end 136 of cylindrical part 138, farthest to the left on the drawing.

The forces are then transferred to a shaft 133 penetrating into perforations common to cylindrical part 136, to first tubular portion 130 and to second tubular portion 131.

From the foregoing, it is noted that the configuration of the link device assures three distinct operating phases:
when the loads are smaller than the fatigue loads, the vibrations are filtered by the air tank, which receives the movements applied by the pressure movements in the hydraulic parts;
when the loads are larger than the fatigue loads, the vibrations are no longer filtered; and
during fluctuations between the fatigue load and the load variations, especially when the link with functional play arrives at the end of travel, the shocks produced are absorbed by hydraulic damping.

It is noted that the fluidic or hydraulic damping concept makes use of equality of pressures between the two chamber parts separated by the annular plate slaved to the movement of the rod.

The invention claimed is:

1. A link device for safety linking of a first member to a second member, comprising:
    a first element having a first link end adapted to be directly linked to the first member, and a second link end adapted to be directly linked to the second member;
    a second element having a first link end adapted to be directly linked to the first member, and a second link end adapted to be directly linked to the second member; and
    a fluidic vibration transfer mechanism that links the first and second elements of the link device to one another, the fluidic vibration transfer mechanism including at least two pressure chambers filled with a pressurized liquid, separated by at least one piston integral with the first or second element, the fluidic vibration transfer mechanism being connected by flexible tubes to a remote vibration-filtering device provided with a distributor having two chambers, connected to said flexible tubes and separated by a distribution piston subjected to the vibration-filtering action of at least one tank of a gas under specified pressure.

2. A link device according to claim 1, wherein the first element includes a tubular portion extending along a longitudinal axis and the second element includes a tubular portion extending along a longitudinal axis, and the fluidic vibration transfer mechanism is mounted concentrically in the interior, on the exterior or at one of the ends of the two tubular portions.

3. A link device according to claim 1, wherein the first and second elements are additionally linked by at least one link with a calculated functional play so that the fluidic vibration transfer mechanism is active up to a specified force level on the link device.

4. A link device according to claim 3, wherein one of the first and second elements includes at least one oblong hole configured to cooperate via a shaft or pin with another hole of diameter smaller than the dimension of the oblong hole, the hole of smaller diameter being made on the other of the first and second elements so that the shaft or pin is able to follow a vibratory movement in the direction of the oblong hole within the limit of the calculated functional play.

5. A link device according to claim 1, wherein the distribution piston cooperates with a fluidic damper configured to damp movements of the distribution piston.

6. A link device according to claim 1, wherein the tank of the vibration-filtering device is connected to an elastic torus introduced into each chamber of a plurality of gas chambers, the volume of which depends, based on a rod and associated washers, displacements of the distribution piston in order to filter the vibrations transmitted by the first and second elements in a vibration-filtering mode.

7. A link device according to claim 6, wherein said associated washers include, disposed between each gas chamber:
    an interior washer integral with the distribution piston; and
    an exterior washer integral with a part for transferring forces of the vibration-filtering device;
    the interior and exterior washers being configured so as to permit vibration filtering in both directions of displacement of the distribution piston.

8. A link device according to claim 5, wherein the fluidic damper that cooperates with the distribution piston includes at least two chambers separated by a damping piston and in communication via a plurality of damping-fluid passages.

9. A link device according to claim 8, wherein at one end at least of travel of the distribution piston, damping imposed by the fluidic damper of the vibration-filtering device is maximized by neutralization of said plurality of damping-fluid passages.

10. An aircraft comprising a link device according to claim 1 for linking a turbojet engine to an attachment pylon.

11. A link device according to claim 2, wherein the first and second elements are additionally linked by at least one link with a calculated functional play so that the fluidic vibration transfer mechanism is active up to a specified force level on the link device.

12. A link device according to claim 2, wherein the distribution piston cooperates with a fluidic damper configured to damp movements of the distribution piston.

13. A link device according to claim 3, wherein the distribution piston cooperates with a fluidic damper configured to damp movements of the distribution piston.

14. A link device according to claim 4, wherein the distribution piston cooperates with a fluidic damper configured to damp movements of the distribution piston.

15. A link device according to claim 2, wherein the tank of the vibration-filtering device is connected to an elastic torus introduced into each chamber of a plurality of gas chambers, the volume of which depends, based on a rod and associated washers, displacements of the distribution piston in order to filter the vibrations transmitted by the first and second elements in a vibration-filtering mode.

16. A link device according to claim 3, wherein the tank of the vibration-filtering device is connected to an elastic torus introduced into each chamber of a plurality of gas chambers, the volume of which depends, based on a rod and associated washers, displacements of the distribution piston in order to filter the vibrations transmitted by the first and second elements in a vibration-filtering mode.

17. A link device according to claim 4, wherein the tank of the vibration-filtering device is connected to an elastic torus introduced into each chamber of a plurality of gas chambers, the volume of which depends, based on a rod and associated washers, displacements of the distribution piston in order to filter the vibrations transmitted by the first and second elements in a vibration-filtering mode.

18. A link device according to claim 5, wherein the tank of the vibration-filtering device is connected to an elastic torus introduced into each chamber of a plurality of gas chambers, the volume of which depends, based on a rod and associated washers, displacements of the distribution piston in order to filter the vibrations transmitted by the first and second elements in a vibration-filtering mode.

\* \* \* \* \*